(12) United States Patent
Allnutt et al.

(10) Patent No.: US 10,852,384 B2
(45) Date of Patent: Dec. 1, 2020

(54) DEVICE AND METHOD FOR DETECTING PRESENCE OF A WIRELESS COMMUNICATION DEVICE

(71) Applicant: HONEYWELL FEDERAL MANUFACTURING & TECHNOLOGIES, LLC, Kansas City, MO (US)

(72) Inventors: Daniel Allnutt, Kansas City, MO (US); Daniel Longo, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 339 days.

(21) Appl. No.: 15/885,128

(22) Filed: Jan. 31, 2018

(65) Prior Publication Data

US 2019/0235042 A1 Aug. 1, 2019

(51) Int. Cl.
| | | |
|---|---|---|
| *H04B 7/00* | (2006.01) | |
| *G01S 3/20* | (2006.01) | |
| *H04W 88/02* | (2009.01) | |
| *H04W 8/00* | (2009.01) | |
| *H04L 27/26* | (2006.01) | |
| *G01V 3/12* | (2006.01) | |

(52) U.S. Cl.
CPC ............ *G01S 3/20* (2013.01); *H04W 8/005* (2013.01); *H04W 88/023* (2013.01); *G01V 3/12* (2013.01); *H04L 27/2601* (2013.01)

(58) Field of Classification Search
CPC ............ G01S 3/20; G01S 5/02; H04W 8/005; H04W 40/20; H04W 88/023; G01V 3/12; H04L 27/2601; H01Q 1/125

USPC .......................... 342/359, 367, 450
See application file for complete search history.

(56) References Cited

U.S. PATENT DOCUMENTS

| | | | |
|---|---|---|---|
| 6,222,458 B1 | 4/2001 | Harris | |
| 6,490,455 B1 | 12/2002 | Park et al. | |
| 7,162,285 B2 | 1/2007 | Owens et al. | |
| 8,019,354 B2 * | 9/2011 | Rae ..................... | H04W 64/003 |
| | | | 455/456.1 |
| 8,482,425 B2 | 7/2013 | Lauer et al. | |
| 8,688,180 B2 | 4/2014 | Catten | |
| 8,731,530 B1 | 5/2014 | Breed et al. | |
| 8,948,782 B2 * | 2/2015 | Shang .................. | H04W 4/023 |
| | | | 455/456.1 |
| 8,981,925 B2 | 3/2015 | Chapin et al. | |
| 9,066,194 B2 | 6/2015 | Noonan et al. | |

(Continued)

*Primary Examiner* — Chuong P Nguyen
(74) *Attorney, Agent, or Firm* — Hovey Williams LLP

(57) ABSTRACT

A device and method for detecting presence of a wireless communication device having an antenna with intrinsic characteristics includes a transmitter, a receiver, a memory element, and a processing element. The transmitter may send a first signal to the antenna of the wireless communication device. The receiver may receive a second signal from the antenna of the wireless communication device, the second signal being a first portion of the first signal that is reflected by the antenna based on intrinsic characteristics of the antenna. The memory element may store intrinsic characteristic information for the antenna. The processing element may determine presence of the wireless communication device by analyzing the second signal against the intrinsic characteristic information stored in the memory element.

19 Claims, 4 Drawing Sheets

(56) References Cited

U.S. PATENT DOCUMENTS

| | | | |
|---|---|---|---|
| 9,172,477 B2 | 10/2015 | Lawrence | |
| 9,696,701 B2 * | 7/2017 | Vasylyev | G05B 15/02 |
| 9,900,428 B1 * | 2/2018 | Hodge | H04M 3/2281 |
| 10,206,064 B2 * | 2/2019 | Hodge | H04M 3/38 |
| 10,362,528 B2 * | 7/2019 | Hodge | H04W 8/005 |
| 10,559,177 B2 * | 2/2020 | Feldman | G08B 13/00 |
| 2005/0064922 A1 * | 3/2005 | Owens | H04W 99/00 455/575.5 |
| 2011/0080300 A1 * | 4/2011 | Bequette | G07C 5/008 340/686.6 |
| 2013/0015947 A1 * | 1/2013 | Best | G01S 19/14 340/5.7 |
| 2017/0094460 A1 * | 3/2017 | Warren | H04W 4/021 |

* cited by examiner

DEVICE AND METHOD FOR DETECTING PRESENCE OF A WIRELESS COMMUNICATION DEVICE

STATEMENT REGARDING FEDERALLY-SPONSORED RESEARCH OR DEVELOPMENT

This invention was made with government support under Contract No.: DE-NA0000622 awarded by the Department of Energy. The government has certain rights in the invention.

FIELD

The present invention relates to devices and methods for detecting presence of a wireless communication device, and more particularly, embodiments concern a device and method for identifying intrinsic characteristics of an antenna to detect presence of a wireless communication device.

BACKGROUND

The presence of cell phones must be detected in many applications including security checkpoints and privacy checkpoints. The primary method for detecting a cell phone involves active signal detection. This active signal detection may include detecting radio frequency ("RF") signals sent during phone calls, text messages, video transmission, and other transmissions. Active signal detection also includes detecting RF signals transmitted when a cell phone is communicating with a nearby base station. Such communication occurs at regular intervals in order to register the cell phone's availability to the nearest base station. Thus, even if a cell phone is not being used, a detector may still detect a cell phone by intercepting one of these base station communications.

Detecting powered-off cell phones, however, is much more difficult. The only known option for detecting powered-off cell phones is to augment active signal detection with the use of a metal detector to signal the presence of ferromagnetic material within the phone. Detecting ferromagnetic material, however, produces many false positives as it detects ferromagnetic material in all personal items. These frequent false positives cause personnel to perform a manual search for the detected item, which defeats the purpose of an autonomous system. Furthermore, ferromagnetic detection often misses cell phones and other predominantly silicon and non-ferrous devices. Thus, there is a need for detecting cell phones, whether powered on or off, to prevent unauthorized devices from being clandestinely brought into an area.

This background discussion is intended to provide information related to the present invention which is not necessarily prior art.

SUMMARY

The present invention solves the above-described and other problems and limitations by providing a device and method for more quickly and accurately detecting presence of cell phones, whether powered on or off. Embodiments of the invention achieve this by identifying intrinsic characteristics of an antenna to detect presence of a wireless communication device.

A first embodiment of the present invention is a detection device for detecting presence of a wireless communication device having an antenna with intrinsic characteristics. The detection device may include a transmitter, a receiver, a memory element, and a processing element. The transmitter may send a first signal to the antenna of the wireless communication device. The receiver may receive a second signal from the antenna of the wireless communication device, the second signal being a first portion of the first signal that is reflected by the antenna based on intrinsic characteristics of the antenna. The memory element may store intrinsic characteristic information for the antenna. The processing element may determine presence of the wireless communication device by analyzing the second signal against the intrinsic characteristic information stored in the memory element.

In a second embodiment, a transmitting antenna and a receiving antenna replace the transmitter and receiver of the first embodiment, and the detection device also comprises one or more thermal sensors, a speaker, and a light. The processing element may also calculate a second portion of the first signal that is absorbed by the antenna based on intrinsic characteristics of the antenna. The processing element may also analyze a region of interest based on a contrast of the hot and cold areas. The processing element may further analyze at least one of: a relative location, a frequency of detection, and a personal identification information. The thermal sensors may measure temperature. The speaker may emit sound, and the light may emit light, to indicate presence of the wireless communication device.

A third embodiment of the present invention includes a method for detecting presence of a wireless communication device having an antenna with intrinsic characteristics. The method may broadly comprise the following steps. A first signal may be sent to the antenna of the wireless communication device. A second signal may be received from the antenna of the wireless communication device, the second signal being a first portion of the first signal that is reflected by the antenna based on intrinsic characteristics of the antenna. Intrinsic characteristic information for the antenna may be stored. Presence of the wireless communication device may be determined by analyzing the second signal against the stored intrinsic characteristic information This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Figure 1:
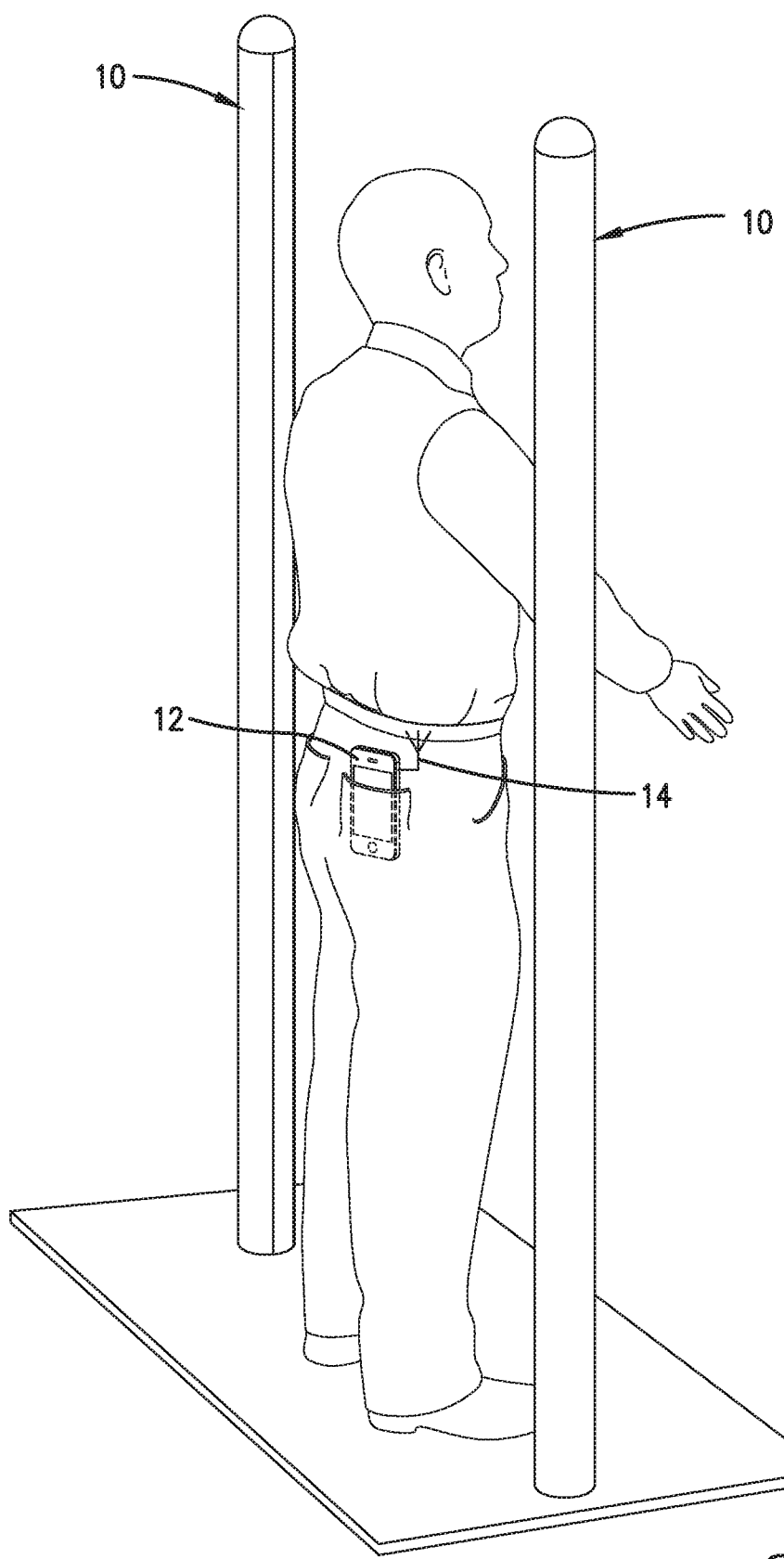
FIG. 1 is a perspective view of an embodiment of a device for detecting presence of a wireless communication device.

Broadly characterized, the present invention provides devices and methods for detecting presence of a wireless communication device. More particularly, embodiments concern a device and method for identifying intrinsic characteristics of an antenna to detect presence of a wireless communication device. Referring to FIG. 1, a detection device 10 may be used for security and privacy purposes in order to prevent wireless communication devices, such as device 12, from entering restricted areas. The detection device 10 may detect presence of the wireless communication device 12 regardless of whether the wireless communication device 12 is powered-on or powered-off.

Generally, the detection device 10 may detect the wireless communication device 12 as follows. A transmitter in the detection device 10 may transmit a radiofrequency signal (or pulse) to an antenna 14 of the wireless communication device 12. The antenna 14 may absorb a portion of the signal and reflect a portion of the signal based on the intrinsic characteristics of the antenna 14. A receiver in the detection device 10 may receive the reflected portion of the signal, and a processing element may calculate the absorbed portion of the signal by subtracting the reflected signal from the originally-transmitted signal. Once the reflected and absorbed portions of the signal are determined, the processing element may compare the reflected and absorbed signals against a database of standard antenna signatures and/or antenna characteristics that are stored in the memory element. If the processing element determines that the reflected signal and/or the absorbed signal matches the characteristics of an antenna stored in the database, then the detection device 10 may indicate detection of the wireless communication device 12.

In combination with, or in addition to, the operation described above, the accuracy for detecting the wireless communication device 12 may be enhanced with a thermal sensor and a software method. The thermal sensor may scan, measure, and/or detect temperature in a detection zone. The processing element 24 may analyze the temperature measurements for a contrast of hot and cold areas to find a region of interest. The software may algorithmically compare data from the reflected signal, absorbed signal, and thermal sensors against the database to detect the wireless communication device 12. In order to eliminate false-positives, the software may analyze the aforementioned characteristics, relative location, frequency of detection, and personal identification information to achieve a high confidence of detection. Once a predetermined statistical threshold is reached, the detection device 10 may indicate absolute detection or absolute non-detection. The detection device 10 may indicate presence of the wireless communication device 12 through an audible indicator and/or a visual indicator, or the detection device 10 may send a logical output indicating the presence of the wireless communication device 12 to a local resource, networked resource, external security system, or any other external system.

Figure 2:
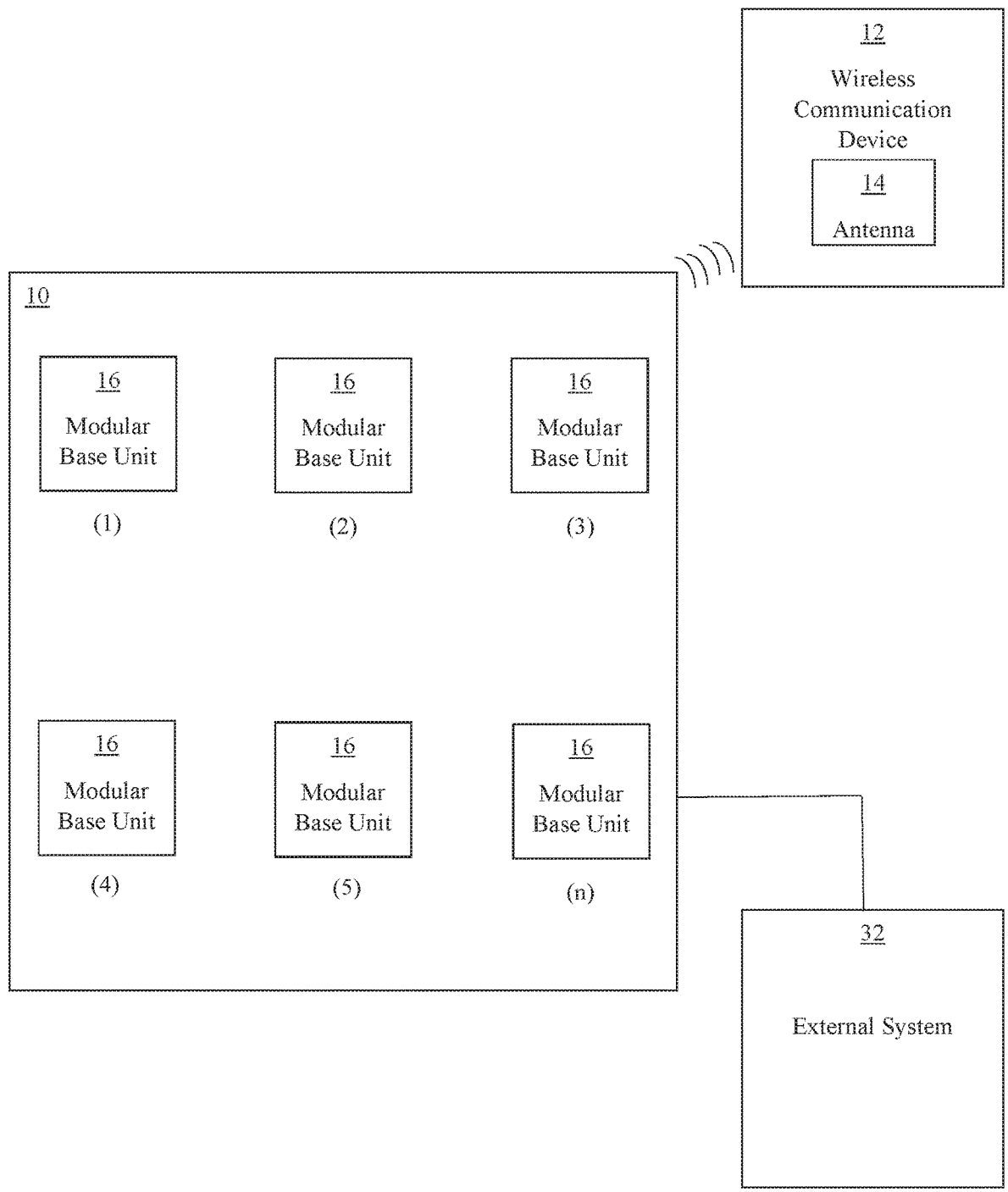
FIG. 2 is a high-level block diagram of an embodiment of the device for detecting presence of the wireless communication device.
Figure 3:
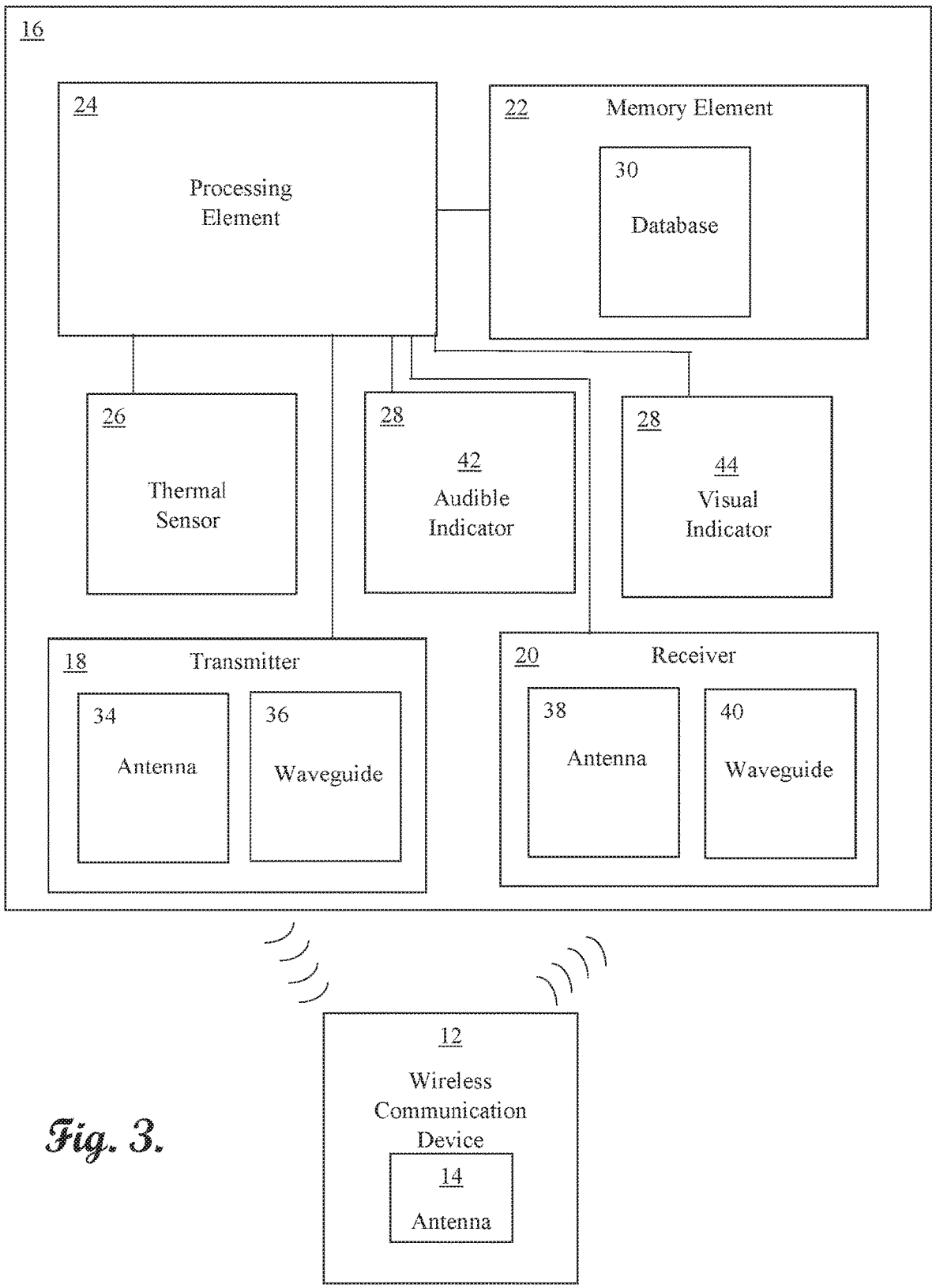
FIG. 3 is a high-level block diagram of a modular base unit of the device in FIG. 2.

Referring to FIGS. 2 and 3, an embodiment of the detection device 10 is shown for detecting presence of the wireless communication device 12 by identifying intrinsic characteristics of the antenna 14. The detection device 10 may broadly comprise one or more modular base units 16. Each modular base unit 16 may include a transmitter 18, a receiver 20, an electronic memory element 22, an electronic processing element 24, a thermal sensor 26, and an indicator 28. The electronic memory element 22 may include a database 30 of intrinsic characteristic information regarding known antennas stored in the memory.

The modular base unit 16 may include a circuit board, such as a printed circuit board, and it may connect the processing element 24 with the transmitter 18, receiver 20, memory element 22, thermal sensor 26, and indicator 28. It will be appreciated by one of ordinary skill in the art that the circuit board and associated components described above may be in electrical communication with a power supply, an integrated circuit, a passive circuit element, or other common electrical components as necessary.

Depending on the combination of modular base units 16, the detection device 10 may be constructed in various form factors. The detection device 10 may be configurable depending on the circumstances for detection of the wireless communication device 12. For example, if detection will occur in a temporary location or plurality of locations, then the detection device 10 may be configured to a smaller form factor, such as a handheld device or a mobile station. Alternatively, if detection will occur in a more permanent area, then the detection device 10 may be configured for a larger form factor, e.g., the detection device 10 may be integrated with doors, turnstiles, and/or archways. It will be appreciated by those skilled in the art that the detection device 10 may be integrated with existing security systems, networks, and/or other systems, which collectively are hereinafter referred to as "the external system 32." Alternatively, the detection device 10 may be a stand-alone.

Referring to FIG. 3, the transmitter 18 may be any electronic device configured for transmitting electromagnetic waves and/or radio waves. Generally, the transmitter 18 may generate radio frequency alternating current to a transmitting antenna 34, which causes the transmitting antenna 34 to radiate electromagnetic waves and/or radio waves. Furthermore, the transmitter 18 and transmitting antenna 34 may be configured to transmit pulsed radiofrequency signals to excite the antenna 14 of the wireless communication device 12. A transmitting waveguide 36 may function as a transmission line to connect the transmitter 18 with the transmitting antenna 34. In some embodiments, the transmitter 18 comprises the transmitting antenna 34 and/or transmitting waveguide 36, and in other embodiments the transmitting antenna 34 and/or transmitting waveguide 36 are separate, distinct elements from the transmitter 18.

The receiver 20 may be as any electronic device configured for receiving electromagnetic waves and/or radio waves. Generally, a receiving antenna 38 may receive electromagnetic waves and/or radio waves and convert the waves into alternating currents that are sent to the receiver 20. A receiving waveguide 40 may function as a transmission line to connect the receiver with the receiving antenna 38. In some embodiments, the receiver 20 comprises the receiving antenna 38 and/or receiving waveguide 40, and in other embodiments the receiving antenna 38 and/or receiving waveguide are separate, distinct elements from the receiver 20.

The transmitting and receiving antennas 34 and 38 may comprise any type of device capable of emitting electromagnetic waves or signals. The transmitting and receiving antennas 34 and 38 may comprise various types of antennas, such as a monopole antenna, dipole antenna, or variations and/or combinations thereof. As specific examples, a monopole antenna may comprise whips (i.e., metal rods), T antennas, inverted L antennas, umbrella antennas, or the like. A dipole antenna may include, for instance, yagi-uda antennas, log periodic antennas, turnstile antennas, corner reflector antennas, patch antennas, or the like. In some embodiments, the transmitting and receiving antenna 34 and 38 may comprise a directional antenna (i.e., high-gain antennas) configured to transmit electromagnetic waves over a relatively focused, narrow beam width. Such directional antennas may comprise a parabolic antenna, helical antenna, yagi antenna, phased array, and the like. In further embodiments, the transmitting antennas 34 may include other simple structures such as conductive coils (i.e., loop antennas), rectangular plates, circular plates, or the like.

In some embodiments, the transmitting antenna 34 and the receiving antenna 38 may be the same, single antenna responsible for both sending electromagnetic waves and receiving electromagnetic waves. Likewise, a single waveguide may function as both the transmitting waveguide 36 and receiving waveguide 40. It is also foreseen that the transmitting antenna 34 and receiving antenna 38 may be two separate, distinct antennas for sending and receiving electromagnetic waves, respectively.

The electronic memory element 22 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 22 may be embedded in, or packaged in the same package as, the processing element. The memory element 22 may include, or may constitute, a "computer-readable medium". The memory element 22 may store the instructions, code, code segments, software, firmware, programs, applications, apps, services, daemons, or the like that are executed by the processing element. The memory element 22 may also store settings, data, documents, sound files, photographs, movies, images, databases, and the like.

The database 30 stored in the memory element may include information about characteristics of antennas, such as mobile phone antennas. The information may concern the intrinsic characteristics of antennas, such as resonant frequency, bandwidth, gain, effective area, radiation pattern, field region, impedance, efficiency, polarization, reflected signal of the excited antenna, and absorbed signal of the excited antenna. The antenna information may derive from the Federal Communications Commission (FCC), which requires commercial mobile radio service (CMRS) providers to comply with spectrum and wireless regulations under Title III.

The electronic processing element 24 may include electronic hardware components such as processors, microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 24 may generally execute, process, or run instructions, code, code segments, software, firmware, programs, applications, apps, processes, services, daemons, or the like. The processing element 24 may also include hardware components such as finite-state machines, sequential and combinational logic, and other electronic circuits that can perform the functions necessary for the operation of the current invention. The processing element 24 may be in electronic communication with the other electronic components through serial or parallel links that include address busses, data busses, control lines, and the like. The electronic processing element 24 may be in electrical communication with the transmitter 18, receiver 20, memory element 22, thermal sensor 26, and the indicator 26. The processing element 24 may also be in electrical communication with other processing elements 24 on other modular base units 16.

In some embodiments, a single processing element 24 and a single memory element 22 may be used for all the modular base units 16 of the detection device 10 as opposed to each modular base unit 16 having its own processing element 24 and memory element 22. For example, a single processing element 24 may connect with any and/or all of the components associated with the modular base units 16.

The thermal sensor 26 may be a mechanical temperature sensor, e.g. a thermometer, or an electrical temperature sensor. The electrical temperature sensor may be an integrated circuit temperature sensor, thermistor, thermocouple, resistance thermometer, silicon bandgap temperature sensor, and the like. The thermal sensor 26 may be used to detect temperatures in order to identify hot and cold regions. Using these hot and cold regions, the detection device 10 and/or processing element 24 may identify regions of interest that may have a strong contrast between a cold region and a hot region. The hot region may indicate the presence of the wireless communication device 12, but it also may pick up on other things producing heat and causing a heat contrast relative to the surrounding area. These false positives, however, are addressed by the primary operation of the device, and thus the thermal sensor 26 may be used to enhance the detection accuracy of the detection device 10.

The indicator 28 may include any component that alerts one of the five human senses (taste, sight, touch, smell, and hearing), such as an audible indicator 42 or a visual indicator 44. The indicator 26 may be configured to indicate to a user that the detection device 10 has detected presence of the wireless communication device 12. The audible indicator 42 may include a speaker or any other component capable of audibly indicating to a user that the wireless communication device 12 has been detected by the detection device 10. For example, the audible indicator 42 may be a buzzer, a bell, an alarm, and the like. The visual indicator 44 may include a light or any other component capable of visually indicating to the user that the wireless communication device 12 has been detected by the detection device 10. For example, the visual indicator 44 may be an LED light, a color, a computer icon, and the like.

Figure 4:
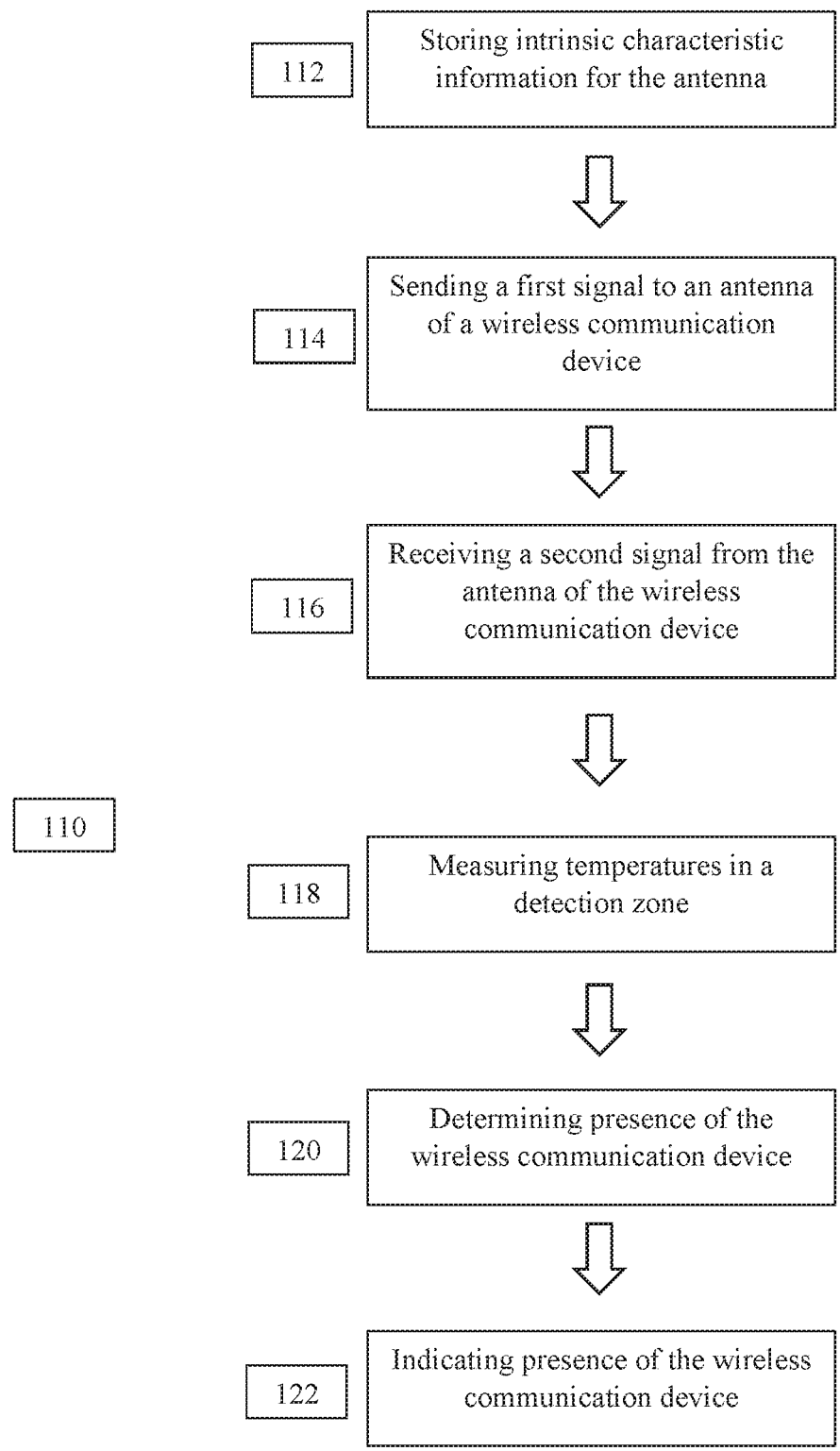
FIG. 4 is a high-level flowchart of steps in a method for detecting presence of a wireless communication device.

Referring also to FIG. 4, the detection device 10 may function substantially as follows. A database 30 of intrinsic characteristic information for antennas may be stored in the memory element 22, as shown in 112. The transmitter 18 may transmit the radiofrequency signal (or pulse) to the antenna 14 of the wireless communication device 12, as shown in 114. The antenna 14 may absorb a portion of the signal and reflect a portion of the signal based on the intrinsic characteristics of the antenna 14. The receiver 20 may receive the reflected portion of the signal, as shown in 116, and the processing element 24 may calculate the absorbed portion of the signal by subtracting the reflected signal from the originally-transmitted signal. Once the reflected and absorbed portions of the signal are determined, the processing element 24 may compare the reflected and absorbed signals against the database 30 in order to determine the presence of the wireless communication device 12, as shown in 120. If the processing element 24 determines that the reflected signal and/or the absorbed signal matches the characteristics of an antenna stored in the database, then the detection device 10 may indicate detection of the wireless communication device 12, as shown in 122.

In combination with, or in addition to, the operation described above, the accuracy for detecting the wireless communication device 12 may be enhanced with the thermal sensor 26 and a software method. The thermal sensor 26 may scan, measure, and/or detect temperature in a detection zone, as shown in 118. The processing element 24 may analyze the temperature measurements for a contrast of hot and cold areas to find a region of interest. The software may algorithmically compare data from the reflected signal, absorbed signal, and thermal sensors 26 against the database 30 to detect the wireless communication device 12. In order to eliminate false-positives, the software may analyze the aforementioned characteristics, relative location, frequency of detection, and personal identification information to achieve a high confidence of detection. Based on the analysis of the characteristics above, the processing element 24 may calculate a statistical likelihood that the wireless communication device 12 is present, and once a predetermined statistical threshold is reached, the detection device 10 may indicate absolute detection or absolute non-detection.

The detection device 10 may include more, fewer, or alternative components and/or perform more, fewer, or alternative actions, including those discussed elsewhere herein, and particularly those discussed below in describing the method 110.

Referring again to FIG. 4, an embodiment is shown of a method 110 for detecting presence of the wireless communication device 12 by identifying intrinsic characteristics for the antenna 14 of the wireless communication device 12. The method 110 may be a corollary to the functionality of the detection device 10 of FIGS. 2 and 3, and may be similarly implemented using the various components of the detection device 10 within the above-described exemplary operating environment. The method 110 may broadly comprise the following steps.

The memory element 22 may store the database 30 of intrinsic characteristic information for antennas, as shown in 112. The processing element 24 may send a signal to the transmitter 18 and may cause the transmitter 18 to generate a RF alternating current through the transmitter waveguide 36 to the transmitting antenna 34. When the transmitting antenna 34 is excited by the RF alternating current, the transmitting antenna 34 may radiate a signal, e.g. a pulse, of electromagnetic waves and/or radiofrequency waves. The transmitting antenna 34 may send the signal to the antenna 14 of the wireless communication device 12, as shown in 114. The transmitted signal may be tuned and pulsed and may excite the antenna 14 of the wireless communication device 12 causing it to reflect a portion of the signal and absorb a portion of the signal based on intrinsic characteristics of the antenna 14. The reflected portion may be received by the receiving antenna 38, converted to an RF alternating current, and transmitted through the receiving waveguide 40 to the receiver 20, as shown in 116. As previously discussed, the transmitting and receiving antenna 34 and 38 may be the same antenna and/or the transmitting and receiving waveguide 36 and 40 may be the same waveguide.

The receiver 20 may demodulate the RF alternating current and convert it into a digital signal. The receiver 20 may output the digital signal to the processing element 24, and the processing element 24 may store data from the digital signal in the memory element 22 representing the reflected signal.

Concurrently, or non-concurrently, the thermal sensors 26 may measure temperatures in a detection zone, as shown in 118. The detection zone represents the area where the detection device 10 is directed to detect the wireless communication device 12. The detection zone may be the area between two posts of the detection device 10 in an entryway, as shown in FIG. 1, or the detection zone may be the direction in which the thermal sensors are pointed, such as a hand-held device. The thermal sensors 26 may measure temperature to detect hot and cold areas and may transmit temperature information to the processing element 24. The processing element 24 may use the memory element 22 to create a heat map of the sensed temperatures. The sensed temperatures and/or heat map may reveal contrast between hot and cold areas. As part of determining the presence of the wireless communication device 12, as shown in 120, the processing element 24 may analyze the temperature information and/or heat map to determine whether a significant contrast between a hot area and a cold area may imply presence of the wireless communication device 12. The detection device 10 and thermal sensors 26 may detect thermal imprints of squares and rectangles by analyzing the lines of hot and cold regions. The significant contrast between a hot area and cold area may be the region of interest, and the processing element 24 may direct further refined scans in the region of interest. For example, the processing element 24 may analyze temperatures associated with spatial locations adjacent to one another and may analyze the contrast between spatially adjacent temperatures. The contrast of spatially adjacent temperatures may indicate the presence of the wireless communication device 12.

In order to determine the presence of the wireless communication device 12, as shown in 120, the processing element 24 may calculate the absorbed portion of the signal by, for example, subtracting the reflected signal from the originally-transmitted signal. The difference may represent the absorbed signal. The processing element 24 may analyze and/or compare the reflected signal and/or the absorbed signal against the database 30 of intrinsic characteristics for antennas. Since antennas generally reflect the electromagnetic waves (the signal) in distinct patterns, then the detection device 10 may identify the presence of the antenna 14 if the reflected signal matches intrinsic characteristic information from the database 30. If the reflected signal and/or absorbed signal matches the intrinsic characteristics of one of the antennas stored in the database 30 of the memory element 22, then the detection device 10 may indicate detection and presence of the wireless communication device 12. Conversely, if there is not a match, then the detection device 10 may not indicate detection or presence of the wireless communication device 12.

Moreover, in order to determine the presence of the wireless communication device, as shown in 120, the processing element 24 may execute a software program stored in the memory element 22 to identify properties of the antenna 14 of the wireless communication device 12 by algorithmically comparing the reflected and absorbed waves against the database 30. With respect to the thermal sensors 26, the processing element 24 may adjust subsequent scans for the thermal sensors 26 to focus on one or more areas of significant temperature contrast and may algorithmically compare the temperature information with the reflected signal, absorbed signal, and database 30 information. The algorithm may incorporate statistical analysis based on the reflected signal, absorbed signal, temperature information, relative location, resonant frequency of the antenna, and/or personal identification information.

Analyzing the relative location of the wireless communication device 12 includes analyzing which location(s) of the body or subject being scanned by the detection device 10 returns the strongest reflected signal(s). The detection device 10 may scan the entire person or subject as it moves through a turnstile, door, or detection zone. The detection device 10 may also analyze the reflected and absorbed signals of the antenna 34 to determine the resonant frequency of the antenna 34. The resonant frequency in combination with the contrasting heat regions detected by the thermal sensors 26 may enhance the accuracy of the detection device 10 for detecting presence of the wireless communication device 12. In some embodiments, certain wireless communication devices 12 may be allowed in an area, e.g., one-way pagers. These pagers have a consistent unique frequency response, and so the detection device may be configured to ignore certain frequency responses, such as one-way pager responses, which would lead to less false positives. In other embodiments, the detection device 10 may be used in an area where wireless communication devices 12 are allowed. For example, an employee may have a security badge to enter an area that allows wireless communication devices 12 and an area that prohibits them. Likewise, a first detection device 10 may be located at an entryway for scanning employees entering the area that allows wireless communication devices 12, and a second detection device 10 may be located at an entryway for scanning employees entering the area that prohibits them. If the employee first scans their badge to enter the allowed area and the first detection device 10 detects presence of the wireless communication device 12, then the first detection device 10 may associate the wireless communication device 12 with that particular employee's security badge. Thus, when the employee uses the security badge to enter the restricted area prohibiting wireless communication devices 12, then the networked security system or other system may flag the employee as having the previously-scanned wireless communication device 12. The flagged employee may then be denied access to the restricted area and/or the employee may be searched further (manually or automatically by the second detection device 10). Furthermore, when this flagged employee scans their security badge to enter the restricted area, the second detection device 10 at the restricted area may focus its detection on regions of interest that were previously identified by the first detection device 10 where wireless communication devices 12 were allowed. This system of detection devices 10 would also help decrease the likelihood of detecting a false positive.

By analyzing these characteristics, the detection device 10 may achieve a high confidence of detection by mitigating false-positives. These characteristics may be analyzed to produce a statistical likelihood of the presence of the wireless communication device 12. If the calculated statistical likelihood meets or exceeds a threshold, then the detection device 10 may indicate absolute detection and presence of the wireless communication device 12. Conversely, if the statistical likelihood is less than the threshold, then the device 10 may indicate absolute non-detection.

The detection device 10 may indicate presence of the wireless communication device 12, as shown in 122, through the audible indicator 42, such as a speaker, that may emit sound to audibly alert the user. Additionally, or alternatively, the detection device 10 may indicate presence of the wireless communication device 12 through the visual indicator 44, such as a light, that may emit light to visually alert the user. The detection device 10 may indicate presence of the wireless communication device 12 by sending a logical output to the detection device 10, local resources, networked resources, and/or external security systems, e.g. the external system 32. When the detection device 10 is configured to work with an existing security system, the output may be used to grant access if the detection device 10 indicates detection, or it may deny access if the device 10 indicates non-detection. Regardless of any indication, the security system may grant on deny access depending on the presence of the wireless communication device 12. The output may also be configured to log activity of scans and detections, and it may alert appropriate response personnel to the nature of the detection.

The method 110 may include more, fewer, or alternative actions, including those discussed elsewhere herein, and particularly those discussed above in describing the detection device 10.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A detection device for detecting presence of a wireless communication device having an antenna with intrinsic characteristics, the detection device comprising:
   a transmitter that sends a first signal to the antenna of the wireless communication device;
   a receiver that receives a second signal from the antenna of the wireless communication device, the second signal being a first portion of the first signal that is reflected by the antenna based on intrinsic characteristics of the antenna;
   a memory element that stores intrinsic characteristic information for the antenna; and
   a processing element that determines presence of the wireless communication device by analyzing the second signal against the intrinsic characteristic information stored in the memory element to determine if the second signal matches any of the intrinsic characteristic information, wherein the analyzing step includes calculating a second portion of the first signal that is absorbed by the antenna based on intrinsic characteristics of the antenna.

2. The detection device according to claim 1, wherein the calculating step includes subtracting the second signal from the first signal.

3. The detection device according to claim 1, wherein the processing element determines presence of the wireless communication device by further analyzing the second portion of the first signal against the intrinsic characteristic information stored in the memory element.

4. The detection device according to claim 1, wherein at least the transmitter and the receiver together form a modular base unit, and wherein the device comprises a plurality of modular base units.

5. The detection device according to claim 1, wherein the first signal is tuned and pulsed to excite the antenna of the wireless communication device.

6. The detection device according to claim 1, wherein the device further comprises an audible indicator that emits sounds to indicate presence of the wireless communication device, and a visual indicator that indicates presence of the wireless communication device.

7. The detection device according to claim 1, wherein the detection device is a hand-held device.

8. A detection device for detecting presence of a wireless communication device having an antenna with intrinsic characteristics, the detection device comprising:
 a transmitter that sends a first signal to the antenna of the wireless communication device;
 a receiver that receives a second signal from the antenna of the wireless communication device, the second signal being a first portion of the first signal that is reflected by the antenna based on intrinsic characteristics of the antenna;
 a memory element that stores intrinsic characteristic information for the antenna; and
 a processing element that determines presence of the wireless communication device by analyzing the second signal against the intrinsic characteristic information stored in the memory element to determine if the second signal matches any of the intrinsic characteristic information, wherein the processing element determines presence of the wireless communication device by further analyzing a relative location, a frequency of detection, and a personal identification information.

9. A detection device for detecting presence of a wireless communication device having an antenna with intrinsic characteristics, the detection device comprising:
 a transmitter that sends a first signal to the antenna of the wireless communication device;
 a receiver that receives a second signal from the antenna of the wireless communication device, the second signal being a first portion of the first signal that is reflected by the antenna based on intrinsic characteristics of the antenna;
 a memory element that stores intrinsic characteristic information for the antenna; and
 a processing element that determines presence of the wireless communication device by analyzing the second signal against the intrinsic characteristic information stored in the memory element to determine if the second signal matches any of the intrinsic characteristic information, wherein the device further comprises one or more thermal sensors that measure temperature in a detection zone, wherein the step of determining presence of the wireless communication device further includes analyzing a contrast of measured temperatures in the detection zone to detect the wireless communication device.

10. A detection device for detecting presence of a powered-off wireless communication device having an antenna with intrinsic characteristics, the detection device comprising:
 a transmitting antenna that radiates a first signal of electromagnetic waves to excite the antenna of the wireless communication device;
 a receiving antenna that receives a second signal from the excited antenna of the wireless communication device, the second signal being a first portion of the first signal that is reflected by the excited antenna based on intrinsic characteristics of the excited antenna;
 a memory element that stores intrinsic characteristic information for the excited antenna;
 one or more thermal sensors that measure temperatures;
 a processing element that determines the presence of the wireless communication device by—
  calculating a second portion of the first signal that is absorbed by the antenna based on intrinsic characteristics of the antenna,
  analyzing the second signal and the second portion of the first signal against the intrinsic characteristic information stored in the memory element to determine if the second signal matches any of the intrinsic characteristic information, wherein the analyzing step includes calculating a second portion of the first signal that is absorbed by the antenna based on intrinsic characteristics of the antenna,
  analyzing a region of interest based on a contrast of the measured temperatures, and
  analyzing at least one of: a relative location, a frequency of detection, and a personal identification information;
 a speaker that emits sound to indicate presence of the wireless communication device; and
 a light that emits light to indicate presence of the wireless communication device.

11. A method for detecting presence of a wireless communication device having an antenna with intrinsic characteristics, the method comprising:
 sending a first signal to the antenna of the wireless communication device;
 receiving a second signal from the antenna of the wireless communication device, the second signal being a first portion of the first signal that is reflected by the antenna based on intrinsic characteristics of the antenna;
 storing intrinsic characteristic information for the antenna; and
 determining presence of the wireless communication device by analyzing the second signal against the stored intrinsic characteristic information to determine if the second signal matches any of the intrinsic characteristic information.

12. The method according to claim 11, wherein the analyzing includes calculating a second portion of the first signal that is absorbed by the antenna based on intrinsic characteristics of the antenna.

13. The method according to claim 12, wherein the calculating includes subtracting the second signal from the first signal.

14. The method according to claim 12, wherein the determining presence of the wireless communication device includes analyzing the second portion of the first signal against the intrinsic characteristic information stored in the memory.

15. The method according to claim 11, wherein the method further comprises the steps of calculating a statistical likelihood of detection based on the analyzing step, and indicating presence of the wireless communication device when the statistical likelihood of detection meets or exceeds a threshold.

16. The method according to claim 11, wherein the sending step includes tuning and pulsing the first signal to excite the antenna of the wireless communication device.

17. The method according to claim 11, wherein the determining the presence of the wireless communication device includes analyzing a relative location, a frequency of detection, and a personal identification information.

18. The method according to claim 11, wherein the method further comprises the step of indicating presence of the wireless communication device.

19. The method according to claim 11, wherein the method further comprises the step of measuring temperatures in a detection zone, and wherein the determining presence of the wireless communication device includes analyzing regions of interest based on a contrast of the measured temperatures in the detection zone to detect the wireless communication device.

\* \* \* \* \*